United States Patent Office 3,285,804
Patented Nov. 15, 1966

3,285,804
COVULCANIZABLE POLYETHER AND SULFUR-CURABLE RUBBER LAMINATE
Anderson E. Robinson, Wilmington, Del., assignor to Hercules Incorporated, a corporation of Delaware
No Drawing. Filed Apr. 11, 1963, Ser. No. 272,229
12 Claims. (Cl. 161—239)

This invention relates to covulcanizable compositions of polyethers, sulfur-curable rubbers, and conventional sulfur-curing agents and the covulcanizates obtained therefrom. More particularly, the invention relates to covulcanizable compositions comprising (1) a copolymer derived from an ethylenically unsaturated glycidyl ether and at least one other monomer selected from the group consisting of alkylene oxides containing at least 3 carbon atoms and monomeric oxetanes, (2) at least one other sulfur-curable rubber, and (3) a conventional sulfur-curing formulation and the covulcanizates obtained therefrom.

The practice of covulcanizing rubbers with sulfur-curing agents is known in the art. However, none of the prior art sulfur-curable rubbers are universally covulcanizable with each of the other sulfur-curable rubbers. For example, butyl rubber (isoprene-isobutylene copolymer) is sulfur vulcanizable but is not covulcanizable with any of the other well-known sulfur-curable rubbers. As used herein, the term "covulcanizing" refers to the treatment of blends (alloys) or plies of two or more polymers to form vulcanized polymer blends or laminates.

It has now unexpected been found that the copolymers defined above are sulfur curable with any of the conventional sulfur-curing rubbers. By blending one of these copolymers with a conventional rubber and covulcanizing, the ozone resistance and low temperature flexibility of the rubber is increased. In addition, the copolymers can be used to form laminates of conventional rubbers which could not otherwise be bonded.

Accordingly, the present invention relates to covulcanizable compositions comprising (1) a copolymer derived from an ethylenically unsaturated glycidyl ether and at least one other monomer selected from the group consisting of alkylene oxides containing at least 3 carbon atoms and monomeric oxetanes, (2) at least one other sulfur-curable rubber, and (3) a conventional sulfur-curing formulation.

The polyethers used in this invention are essentially linear, water-insoluble, elastomeric copolymers which can be vulcanized with conventional sulfur-curing formulations. They are produced by the copolymerization of at least one of the group alkylene oxides containing at least 3 carbon atoms and monomeric oxetanes with an ethylenically unsaturated glycidyl ether. Exemplary alkylene oxides are 1,2-propylene oxide, butene-1 oxide, cis- and trans-butene-2 oxides, hexene-1 oxide, hexene-2 oxides, dodecene-1 oxide, hexadecene-1 oxide, octadecene-1 oxide, etc. Exemplary monomeric oxetanes are oxetane and the alkyl oxetanes such as 2-butyloxetane, 2-octyloxetane, etc. Exemplary of the ethylenically unsaturated glycidyl ethers are allyl glycidyl ether, methallyl glycidyl ether, vinylcyclohexyl glycidyl ether, α-terpinyl glycidyl ether, o-allylphenyl glycidyl ether, crotyl phenyl glycidyl ether, etc. Those copolymers containing from about 0.5% to about 15%, preferably from about 2% to about 10% by weight of ethylenically unsaturated glycidyl ether are most preferred for use in this invention. These copolymers can be prepared by contacting a mixture of ethylenically unsatruated glycidyl ether and at least one of the above monomeric oxides with an organoaluminum compound, preferably one which has been reacted with from 0.1 to 2 moles of a chelating agent such as acetylacetone, trifluoroacetylacetone, etc., and/or reacted with from about 0.1 to about 1.5 moles of water per mole of organoaluminum compound. Exemplary of the organoaluminum compounds that can be so reacted with the chelating agent and/or water and used as the catalyst are triethylaluminum, tripropylaluminum, triisobutylaluminum, trioctylaluminum, diethylaluminum hydride, diisobutylaluminum hydride, etc.

The polymerization reaction is generally carried out in the presence of an inert, liquid, organic diluent but can be carried out in an essentially bulk polymerization process. Suitable diluents are the ethers, halogenated hydrocarbons, or preferably hydrocarbon diluents such as propane, butane, n-heptane, cyclohexane, benzene, etc., and mixtures of such diluents. The temperature of the polymerization process can be varied over a wide range generally from about −80° C. to about 250° C. and, while atmospheric or autogenous pressure is usually used, the pressure can be varied from subatmospheric up to several atmospheres, if desired.

Any of the sulfur-curable rubbers can be covulcanized with one of the copolymers described above in accordance with this invention. Exemplary sulfur-curable rubbers are styrene—butadiene rubber, natural rubber, acrylonitrile—butadiene rubber, isoprene-isobutylene rubber, cis-polybutadiene, cis-polyisoprene, etc.

Any of the sulfur-curing formulations normally used in the rubber industry can be used in accordance with this invention. Typical formulations contain sulfur and an accelerator. In addition, they can contain accelerator activators, stabilizers, age resisters, etc. Exemplary of the accelerators used in sulfur-curing formulations are the thiazole compounds such as benzothiazyl disulfide, mercaptobenzothiazole, N-oxydiethylene benzothiazole-2-sulfenamide, etc.; the dithiocarbamates such as bismuth dimethyldithiocarbamate, lead dimethylthiocarbamate, selenium diethyldithiocarbamate; and the thiuram sulfides such as tetraethylthiuram mono- and disulfides, tetramethylthiuram mono- and disulfides, dipentamethylene thiuram tetrasulfide, etc. Exemplary of the accelerator activators are the metal oxides such as zinc oxide, magnesium oxide, lead monoxide, etc., and the fatty acids such as stearic acid, etc. The relative proportions of the different ingredients in a conventional formulation will vary depending upon the specific ingredients of the formulation used and the polymers to be vulcanized. However, in general, from about 0.1% to about 10% sulfur, based on total elastomer (total copolymer and rubber), and from about 0.1% to about 10% accelerator, based on total elastomer, will be used. For a more exhaustive list of conventional sulfur-curing formulations, see "The Vanderbilt Rubber Handbook" (1958), published by R. T. Vanderbilt Company, Inc., 230 Park Avenue, New York, New York.

As stated above, the covulcanizable compositions of this invention are either blends or plies. In the case of covulcanizable blends, the amount of the copolymer can be varied within wide limits depending upon the specific product desired. However, in general, the amount of copolymer will vary from about 10% to about 90% by weight of the blend. The blends can be prepared by any of the conventional rubber blending methods. For example, the copolymer and rubber can merely be blended on a two-roll mill with a sulfur-curing formulation, preferably being added after the other components are thoroughly blended. Another method is to prepare separate solutions of the copolymer and rubber, then mix them together, evaporate the solvent, and blend in the curing formulation. In the case of covulcanizable plies to form laminates, the curing formulation will be blended individually with the copolymer and rubber before they are laid up. In either the case of blends or plies, curing will be accomplished by heating the covulcanizable composition under pressure. In general, the curing temperature will vary from about 120° C. to about 180° C. and the pressure from about 10 p.s.i. to about 2000 p.s.i.

The following examples are presented for purposes of illustration, parts and percentages being by weight unless otherwise specified. The extent of covulcanization may be indicated by insolubility in (expressed as percent gel) and swelling by (expressed as percent swell) solvents which are complete solvents for the unvulcanized copolymer and rubber. Solvents which readily dissolve the copolymer and rubber prior to vulcanization merely swelled the covulcanizate without appreciably altering its contours. The degree of swelling is inversely proportional to the cross-link density or state of curve.

In those examples where shown, percent gel and swell were determined as follows: A covulcanizate specimen weighing about 200 milligrams was macerated in 60 cc. of toluene for 4 hours at 80° C. The swollen sample was then blotted free of excess toluene and promptly weighed in the swollen condition. The specimen was then dried in vacuum for 4 hours at 80° C. and reweighed. The initial, swollen and dry weights were each corrected to a 100% polymer and rubber base. From these figures, percent gel is calculated by the formula:

$$\frac{\text{corrected dry weight}}{\text{corrected initial weight}} \times 100 = \text{percent gel}$$

Similarly, percent swell is calculated by the formula:

$$\frac{\text{corrected swollen weight} - \text{corrected dry weight}}{\text{corrected dry weight}} \times 100 = \text{percent swell}$$

The molecular weight of some of the copolymers and rubbers employed in the examples is shown by the Reduced Specific Viscosity (RSV) given therein. By the term "Reduced Specific Viscosity" is meant the specific viscosity, corrected to zero shear gradient, divided by the concentration of the solution in grams per 100 milliliters, measured at the indicated temperature, on a solution containing 0.1 gram of the polymer or rubber in 100 milliliters of the solution.

*Example 1*

This example demonstrates the covulcanization of a propylene oxide-allyl glycidyl ether copolymer containing 5 weight percent of allyl glycidyl ether and having an RSV of 8.8 as determined in benzene at 25° C. with a commercial, rosin-emulsified, salt-coagulated styrene-butadiene rubber containing 24 weight percent styrene and having a specific gravity of 0.94 and a Mooney viscosity (ML/4–212) of approximately 52. The copolymers were blended by mixing equal amounts of 5 weight percent benzene solutions of the two and then allowing the benzene to evaporate. The sulfur-curing formulation was then blended in on a two-roll mill at 80° C. over a period of 10 minutes. The resulting covulcanizable composition contained the following ingredients:

Composition:                          Parts by weight
  Copolymer-rubber blend _____ 100
  Zinc oxide _____ 5
  Stearic acid _____ 1
  Sulfur _____ 2
  Benzothiazyl disulfide _____ 1
  Tetramethylthiuram disulfide _____ 2

The composition was cured in a steel mold for 40 minutes under a pressure of 500 p.s.i. at a temperature of 155° C. The resulting covulcanizate was tested and found to have a percent gel of 94 and a percent swell of 460.

*Example 2*

A sample of the propylene oxide—allyl glycidyl ether copolymer described in Example 1 was covulcanized with natural rubber (masticated, ribbed smoked sheet). Equal parts of the copolymer and rubber were blended and covulcanized exactly as described in Example 1. The resulting covulcanizate was tested and found to have a percent gel of 96 and a percent swell of 545.

*Example 3*

A sample of the propylene oxide-allyl glycidyl ether copolymer described in Example 1 was covulcanized with a sample of acrylonitrile-butadiene rubber containing 32 weight percent acrylonitrile and having a specific gravity of 0.98. Equal parts of the copolymer and rubber were blended and covulcanized exactly as described in Example 1. The resulting covulcanizate was tested and found to have a percent gel of 91 and a percent swell of 360.

*Example 4*

This example compares the covulcanization of the propylene oxide-allyl glycidyl ether described in Example 1 and butyl rubber containing approximately 3.0 weight percent isoprene with the covulcanization of blends of other sulfur-curing rubbers and the butyl rubber. Each blend was prepared and covulcanized exactly as described in Example 1. The rubbers use and their amounts and the percent gel and swell of the resulting covulcanizates are tabulated below.

TABLE 1

|  | Parts | | | |
|---|---|---|---|---|
|  | a | b | c | d |
| Propylene oxide-allyl glycidyl ether | 50 |  |  |  |
| Styrene-butadiene rubber a |  | 50 |  |  |
| Natural rubber b |  |  | 50 |  |
| Acrylonitrile-butadiene rubber c |  |  |  | 50 |
| Butyl rubber | 50 | 50 | 50 | 50 |
| Percent gel | 100 | 51 | 58 | 53 |
| Percent swell | 345 | 425 | 385 | 200 | a Described in Example 1.
b Smoked sheet.
c Described in Example 3.

It can be seen from the above comparison that propylene oxide-allyl glycidyl ether copolymer can be essentially completely covulcanized with butyl rubber, while styrene-butadiene rubber, natural rubber or acrylonitrile-butadiene rubber cannot.

*Example 5*

This example demonstrates the covulcanization of a trimethylene oxide-allyl glycidyl ether copolymer containing 4 weight percent allyl glycidyl ether and having an RSV of 36 as determined in chloroform at a temperature of 25° C., with natural rubber (masticated, ribbed smoked sheet). Equal parts of the copolymer and rubber were blended and covulcanized exactly as described in Example 1. The resulting covulcanizate was tested and found to have a percent gel of 93 and a percent swell of 340.

*Example 6*

This example demonstrates the formation of a laminate by covulcanization. Covulcanizable stocks of natural rubber and the propylene oxide-allyl glycidyl ether described in Example 1 were prepared by compounding the following ingredients:

|  | Parts | |
| --- | --- | --- |
|  | A | B |
| Natural rubber | 100 | |
| Propylene oxide-allyl glycidyl ether | | 100 |
| Zinc oxide | 5 | 5 |
| Stearic acid | 1 | 1 |
| Fast extruding furnace black | 25 | 25 |
| Sulfur | 2 | 2 |
| 2-mercaptobenzothiazole | 1 | 1 |
| Tellurium diethyldithiocarbamate | 2 | 2 |

Each stock was sheeted off as a 200-mil slab. The laminate was prepared by sandwiching together a ply cut from each slab and then curing for 40 minutes at a temperature of 155° C. under a pressure of 500 p.s.i. A slip of aluminum foil inserted between the plies at one end provided grip tabs for testing. The resulting laminate was tested for T-peel strength in the manner of ASTM D1876-61T and was found to have a strength of 6 lbs./inch width.

*Example 7*

This example compares the lamination by covulcanization of butyl rubber to natural rubber with and without the use of a copolymer tie gum. Covulcanizable stocks of butyl rubber, natural rubber and the propylene oxide-allyl glycidyl ether described in Example 1 were prepared by compounding the following ingredients:

|  | Parts | | |
| --- | --- | --- | --- |
|  | A | B | C |
| Butyl rubber | 100 | | |
| Natural rubber | | 100 | |
| Propylene oxide-allyl glycidyl ether | | | 100 |
| Zinc oxide | 5 | 5 | 5 |
| Stearic acid | 1 | 1 | 1 |
| Fast extruding furnace black | 25 | 25 | 25 |
| Sulfur | 2 | 2 | 2 |
| 2-mercaptobenzothiazole | 1 | 1 | 1 |
| Tellurium diethyldithiocarbamate | 2 | 2 | 2 |

The butyl rubber and natural rubber stocks were sheeted off as 200-mil slabs and the copolymer stock as a 20-mil slab. Two specimens were prepared by sandwiching together plies cut from the slabs of the butyl rubber and nautral rubber. In one specimen a ply of the 20-mil copolymer was sandwiched between the butyl rubber and natural rubber plies. Each specimen was then cured for 40 minutes at a temperature of 155° C. under a pressure of 500 p.s.i. A slip of aluminum foil was inserted between the plies of each specimen as described in Example 6. Each specimen was tested for T-peel strength as described in Example 6. The specimen prepared without the copolymer tie gum had a T-peel strength of less than 0.5 p.s.i., while the specimen prepared with the copolymer tie gum had a T-peel strength above 2 p.s.i.

*Example 8*

This example demonstrates the covulcanization of a propylene oxide—o-allylphenyl glycidyl ether copolymer containing 4 weight percent o-alylphenyl glycidyl ether and having an RSV of 6 as determined in benzene at a temperature of 25° C. with an acrylonitrile—butadiene rubber containing 28 weight percent acrylonitrile and having a specific gravity of 0.97 and a Mooney viscosity (ML/2-212) of approximately 85. Equal parts of the copolymer and rubber were blended and covulcanized exactly as described in Example 1. The resulting covulcanizate was tested and found to have a percent gel of 96 and a percent swell of 155.

What I claim and desire to protect by Letters Patent is:

1. A covulcanizable composition comprising (1) a copolymer derived from an ethylenically unsaturated glycidyl ether and at least one other monomer selected from the group consisting of alkylene oxides containing at least 3 carbon atoms and monomeric oxetanes, (2) at least one other sulfur-curable rubber, and (3) a curing agent comprising sulfur and an organic accelerator.

2. The composition of claim 1 wherein the copolymer and sulfur-curable rubber are blended.

3. The composition of claim 1 wherein the copolymer and sulfur-curable rubber are in the form of plies.

4. The composition of claim 1 wherein the copolymer is propylene oxide—allyl glycidyl ether.

5. The composition of claim 1 wherein the copolymer is trimethylene oxide—alyl glycidyl ether.

6. The composition of claim 1 wherein the copolymer is propylene oxide—o-allylphenyl glycidyl ether.

7. The composition of claim 1 wherein the sulfur-curable rubber is styrene—butadiene rubber.

8. The composition of claim 1 wherein the sulfur-curable rubber is natural rubber.

9. The composition of claim 1 wherein the sulfur-curable rubber is acrylonitrile—butadiene rubber.

10. The composition of claim 1 wherein the sulfur-curable rubber is butyl rubber.

11. A covulcanized composition comprising a blend of a copolymer derived from an ethylenically unsaturated glycidyl ether and at least one other monomer selected from the group consisting of alkylene oxides containing at least 3 carbon atoms and monomeric oxetanes and at least one other sulfur-curable rubber, said blend having been vulcanized with a curing agent comprising sulfur and an organic accelerator.

12. A covulcanized laminate comprising at least two strongly bonded plies, at least one ply comprising a vulcanized copolymer derived from an ethylenically unsaturated glycidyl ether and at least one other monomer selected from the group consisting of alkylene oxides containing at least 3 carbon atoms and monomeric oxetanes and at least one other ply comprising a vulcanized sulfur-curable rubber, said laminate having been covulcanized with a curing agent comprising sulfur and an organic accelerator.

No references cited.

ALEXANDER WYMAN, *Primary Examiner.*

R. J. ROCHE, *Assistant Examiner.*